United States Patent
Goodart

[15] 3,656,525
[45] Apr. 18, 1972

[54] EGG SEPARATOR

[72] Inventor: Everett E. Goodart, 1059 Greenfield Avenue, El Cajon, Calif. 92020

[22] Filed: Aug. 11, 1970

[21] Appl. No.: 63,032

Related U.S. Application Data

[63] Substitute for Ser. No. 744,005, July 11, 1968, abandoned.

[52] U.S. Cl. .................................................146/2 D
[51] Int. Cl. ...................................................A47j 43/14
[58] Field of Search .........................................146/2 C, 2 D

[56] References Cited

UNITED STATES PATENTS

| 657,125 | 9/1900 | Lindsay | 146/2 D |
| 2,523,777 | 9/1950 | Polcat | 146/2 D |

FOREIGN PATENTS OR APPLICATIONS

| 383,489 | 11/1923 | Germany | 146/2 D |

*Primary Examiner*—Willie G. Abercrombie
*Attorney*—Robert K. Rhea

[57] ABSTRACT

An upwardly open part-spherical egg shell contents receiving receptacle is provided, in its bottom portion, with an elongated albumen passing and egg yoke retaining slot terminating at its respective ends in a teardrop-shape.

2 Claims, 3 Drawing Figures

PATENTED APR 18 1972 3,656,525

EVERETT E. GOODART
INVENTOR

BY

Robert K. Rhea
AGENT

3,656,525

EGG SEPARATOR

CROSS REFERENCE TO RELATED APPLICATION

This application is a substitute of an application filed by me on July 11, 1968 in the U.S. Pat. Off., Ser. No. 744,005 for Egg Separator, now abandoned.

BACKGROUND OF THE INVENTION

1. Field of the Invention

The present invention relates to cooking utensils and more particularly to an egg separator.

Egg separators presently in use usually feature a shallow dish-like receptacle having a central recess which nests the egg yoke and depends, for the separation of the albumen from the yoke, upon laterally disposed slots.

2. Description of the Prior Art

Two egg separators of this class are disclosed by U.S. Pat. Nos. 941,415 and 2,035,065. U.S. Pat. No. 657,125 discloses an egg separator having elongated slots in its lowermost portion. U.S. Pat. No. 2,523,777 discloses an egg separator having lateral slots extending to its lowermost dish-shaped portion. In egg separators, as shown by these prior patents, egg yoke separation from albumen is not as easily achieved as it is with the present invention for the reason that some albumen clings to the egg yoke and, if a small size egg is being separated, not all of the albumen will be drawn off or fall through the lateral slots.

This invention, on the other hand, provides an elongated slot which underlies the position of the egg yoke without permitting its passage therethrough and further includes teardrop-shaped terminal end portions for the slot which induces separation of the albumen from the yoke by its self adherence properties. The albumen thus flowing through one or both of the teardrop-shaped end portions of the slot clings to that portion of albumen surrounding the yoke and draws off, by gravity, substantially all of the albumen.

SUMMARY OF THE INVENTION

A unitary upwardly open receptacle, preferably of part-spherical inner surface configuration, having diametrically opposed support handles, is provided with an elongated slot in its depending portion. The slot terminates in teardrop-shaped end portions so that when an egg shell is broken and its contents emptied into the receptacle the egg yoke settles in the bottom thereof and spans the central portion of the slot while the albumen drains off, by gravity, through the teardrop-shaped end portions of the slot and from the egg yoke through the narrow portion of the slot.

The principal object of the invention is to provide an egg separator for separating the albumen from the yokes of eggs.

DESCRIPTION OF THE PREFERRED EMBODIMENT

Figure 1:
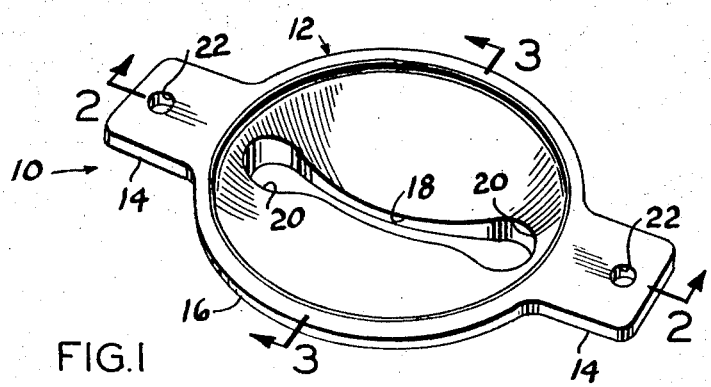
FIG. 1 is a perspective view of the egg separator.
Figure 2:
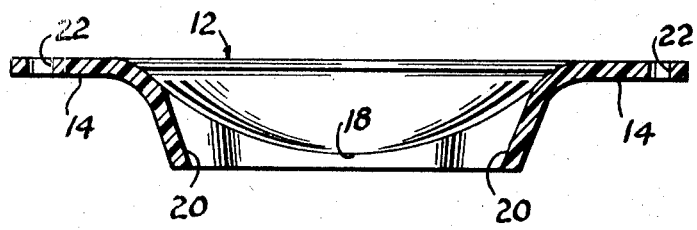
FIGS. 2 and 3 are vertical cross-sectional views taken substantially along the lines 2—2 and 3—3, respectively, of FIG. 1.
Figure 3:
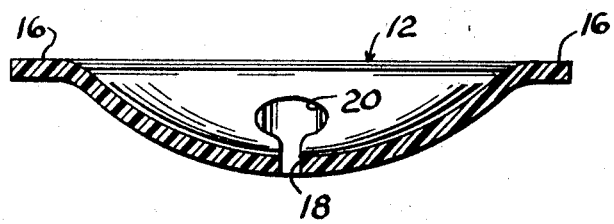

Like characters of reference designate like parts in those figures of the drawings in which they occur.

In the drawings:

The reference numeral 10 indicates the device, as a whole, comprising an upwardly open receptacle or body portion 12 which is part-spherical in general configuration having diametrically opposed outstanding supports or handle portions 14.

The device 10 is preferably formed of plastic material with the diametric dimension of the body portion at least three times the diameter of the yoke of a medium size hen egg.

The upper surface of the handles 14 and body portion 12 lie in a single plane. The upper edge of the body portion is characterized by a horizontal flange 16 which joins or merges with the respective side edge of each handle portion 14. The depending portion of the body 12 is provided with a relatively narrow slot 18 longitudinally aligned with the handles 14, however, the slot 18 may be placed in any desired position with respect to the handles. The slot 18 is characterized by teardrop-shaped end portions 20 which are transversely of greater dimension than the central portion of the slot and are disposed outwardly of the diametric limit of an egg yoke when placed in the body. The central portion of the slot is relatively narrow when compared with the diameter of an egg yoke, not shown, when placed therein so that surface tension of the egg yoke prevents the latter from entering or passing through the slot.

OPERATION

In operation the device 10 is placed in spanning relation across a vessel, not shown, so that its handle portions 14 are supported by the rim thereof. Alternatively the separator may be manually held by one or both of its handles over a vessel in which the albumen is to drain. The shell of the egg is broken, in any desired manner, and its contents emptied into the body portion 12. The egg yoke settles, by gravity, to the central portion of the slot 18 while the albumen falls, by gravity, through one or both of the teardrop-shaped end portions 20 of the slot. Since the albumen tends to adhere or cling to itself and the egg yoke, it tends to remove all of the albumen contained by the egg shell downwardly, by gravity, through the slot. Each of the handles are preferably provided with an opening or aperture 22 to form hang-up holes for the device. Since the device is unitary in construction and includes no overlapping or joined parts, it is easily maintained in a clean and sanitary condition.

Obviously the invention is susceptible to some change or alteration without defeating its practicability, and I therefore do not wish to be confined to the preferred embodiment shown in the drawings and described herein.

I claim:

1. An egg separator, comprising: a substantially dish-shaped body having an upwardly locking
    part-spherical concave surface forming a receptacle,
    said body having a relatively narrow elongated slot in its lowermost portion in which the slot is characterized by teardrop-shaped end portions transversely greater than the transverse width of the slot intermediate its ends and diametrically opposed handles projecting outwardly from the upper limit of said body.
2. Structure as specified in claim 1 in which the upper edge of said body is further characterized by a horizontal flange merging, at its respective ends, with said handle supports.

* * * * *